Jan. 6, 1959    J. C. LANG    2,866,976
HOGSHEAD MACHINE
Filed Feb. 15, 1956    4 Sheets-Sheet 1
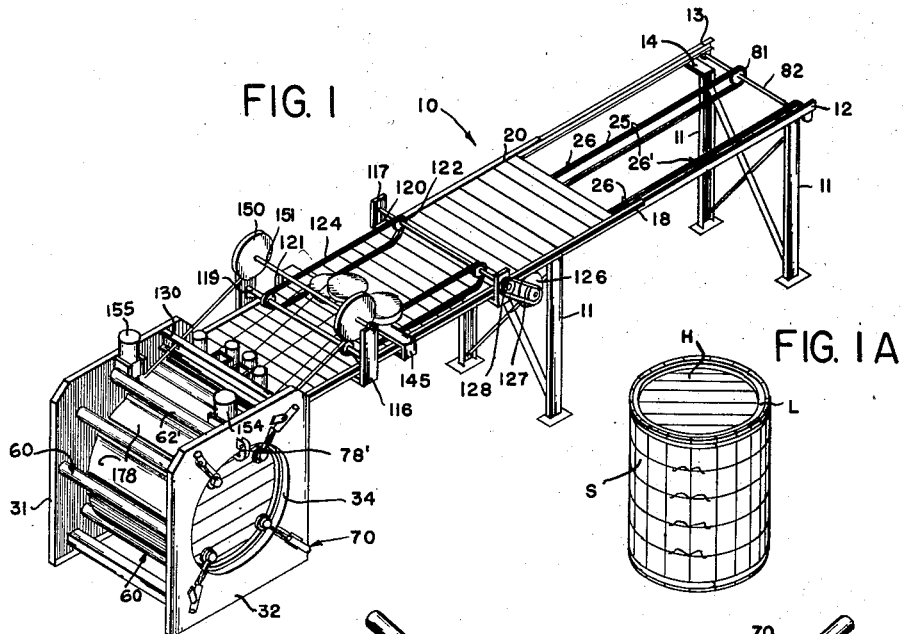
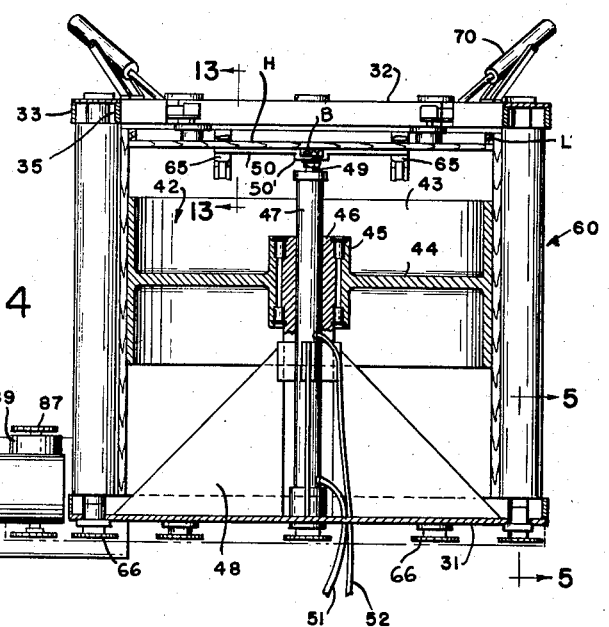
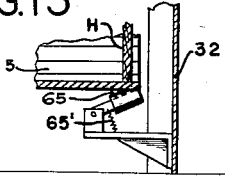
INVENTOR
J.C. LANG
BY *A. Yates Dowell*
ATTORNEY

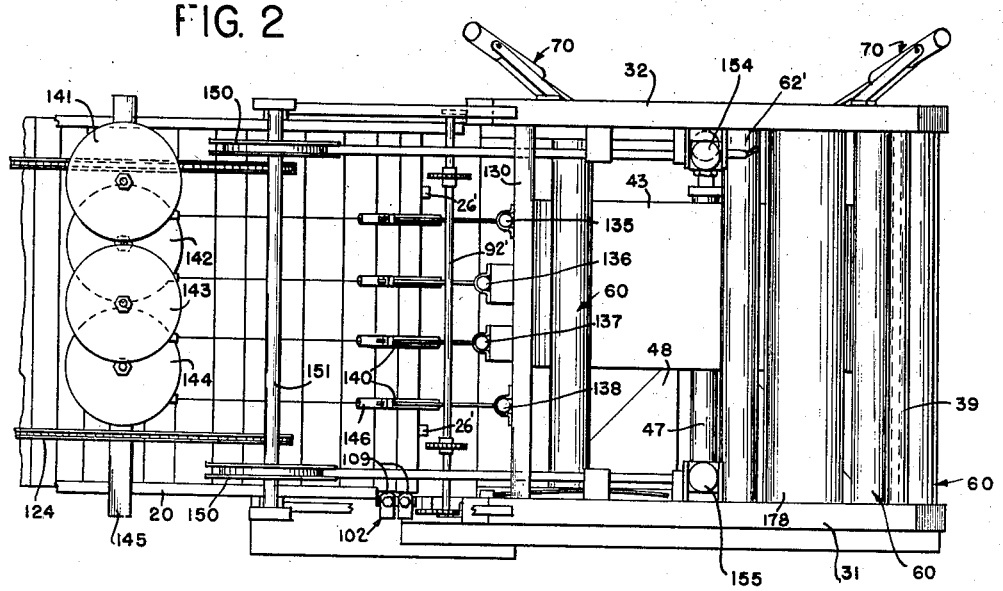

Jan. 6, 1959
J. C. LANG
2,866,976
HOGSHEAD MACHINE
Filed Feb. 15, 1956
4 Sheets-Sheet 3
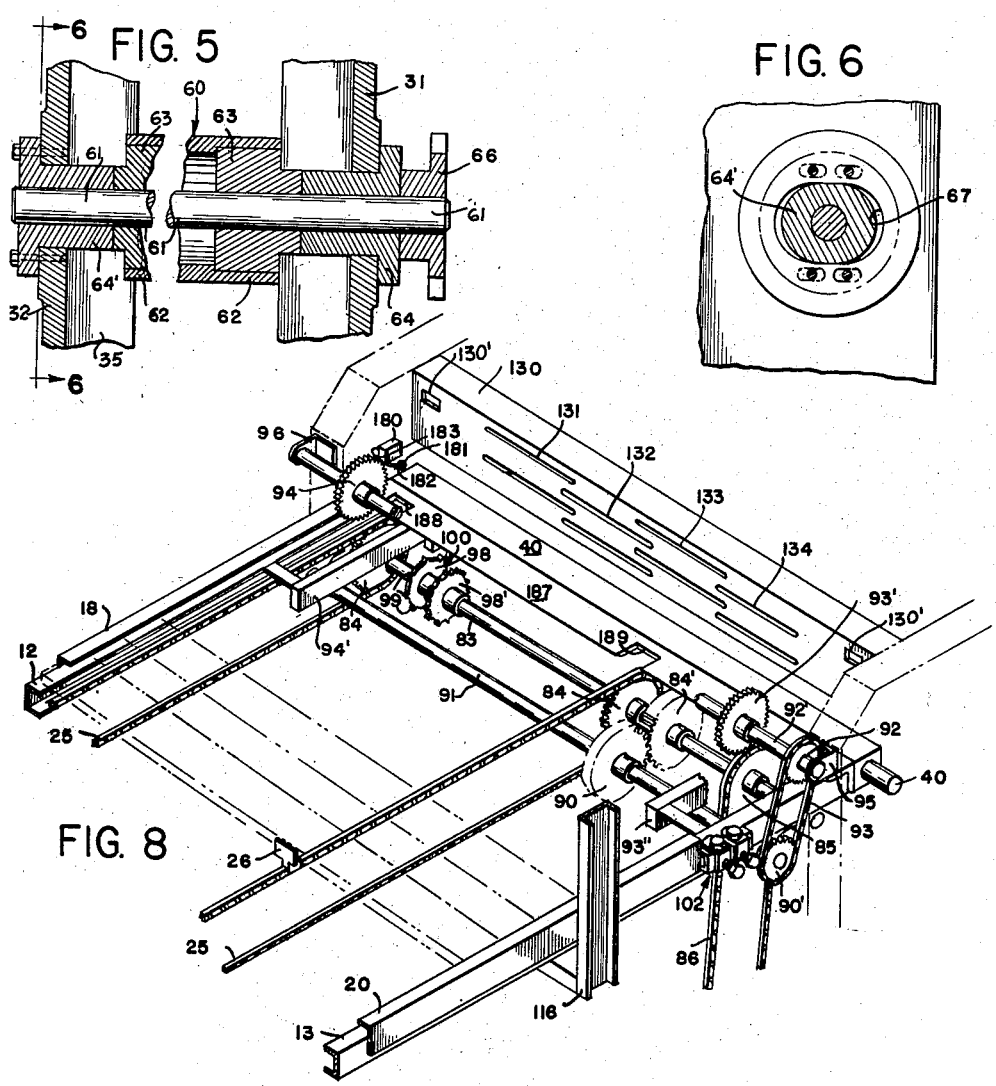
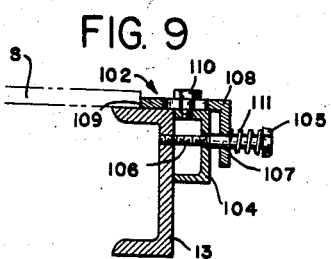
INVENTOR
J.C. LANG
BY *A. Yates Dowell*
ATTORNEY

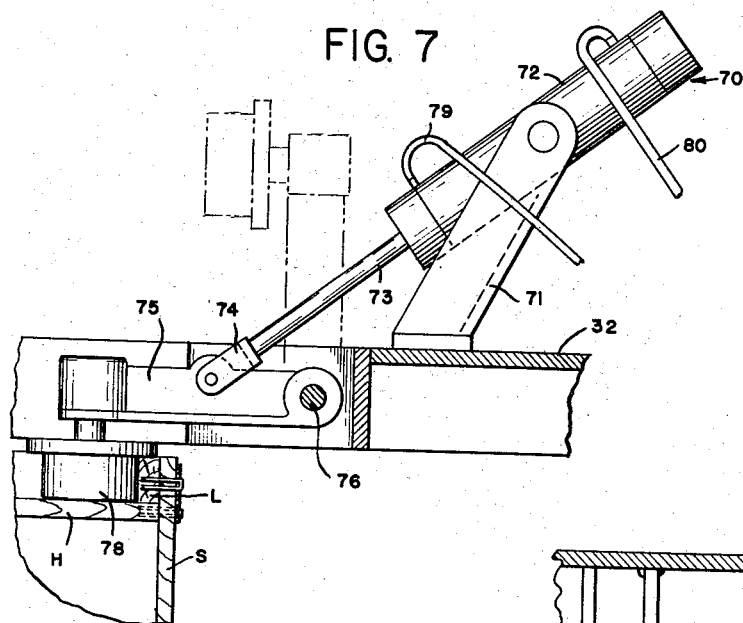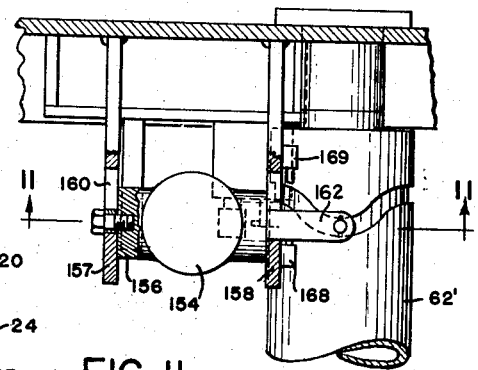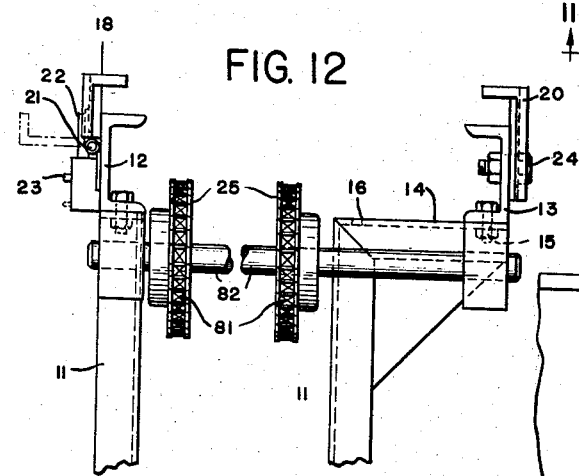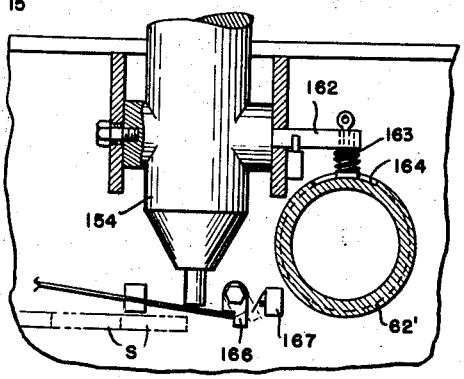

United States Patent Office 2,866,976
Patented Jan. 6, 1959

2,866,976

HOGSHEAD MACHINE

John C. Lang, Louisville, Ky., assignor, by mesne assignments, to Grey Equipment, Inc., a corporation of North Carolina Application February 15, 1956, Serial No. 565,718

12 Claims. (Cl. 1—129)

This invention relates to hogsheads, casks, barrels and the like, and more particularly to a machine for producing them substantially automatically at a rapid rate.

Machines for producing hogsheads have been described heretofore in publications. These are not known to be in use, commercially, however. The conventional method of producing hogsheads in this country includes the manual placement of the required number of staves into a jig for forming them into proper shape, and manually securing a head thereto. This is an ardous, time-consuming operation requiring skilled labor and frequently results in the production of inferior hogsheads.

Accordingly, it is an object of the present invention to provide a machine adapted to rapidly produce hogsheads of high quality at a rapid rate, and which requires a minimum of unskilled labor, skilled labor being unnecessary.

A further object is the provision of an inexpensive relatively simple, substantially automatic machine for producing hogsheads at a rapid rate and which is adjustable for producing hogsheads of different dimensions.

These and other objects of the invention will become apparent from the following description in conjunction with the accompanying drawings in which:

Fig. 1 is a perspective illustrating one embodiment of the present invention;

Fig. 1(A), a perspective of a hogshead produced in accordance with the present invention;

Fig. 2, a top plan to an enlarged scale of the stave feeding assembly and forming end of the machine;

Fig. 3, a side elevation of the machine illustrated in Fig. 2;

Fig. 4, a section on the line 4—4 of Fig. 3;

Fig. 5, an enlarged vertical transverse section taken on the line 5—5 of Fig. 4 showing a portion of a transport roller and its mounting which permits radial adjustment of each end of the transport roller;

Fig. 6, a section on the line 6—6 of Fig. 5 showing the means for radial adjustment of the transport rollers;

Fig. 7, an enlarged elevation of the liner holding mechanism at the bottom end of the hogshead;

Fig. 8, a perspective to an enlarged scale of the feeding end of the conveyor, including the end aligner pusher and stapler mounting channel bar;

Fig. 9, an enlarged sectional detail of the end aligner;

Fig. 10, an enlarged fragmentary plan of the reciprocable bottom end band stapler;

Fig. 11, a section on the line 11—11 of Fig. 10;

Fig. 12, a fragmentary end view of the conveyor and stave guides; and

Fig. 13, a detail of one of the rollers for urging the head upwardly against the staves and showing fragments of the staves in position thereround.

Briefly stated, the hogshead machine of the present invention includes a table on which staves are placed and carried by a conveyor to the hogshead assembling and forming apparatus. Means are provided for moving the staves on the conveyor into compact side-by-side relationship and with their bottom ends alined. Just prior to being fed into the forming apparatus the staves are connected together by spaced wires which are automatically stapled to the staves. The connected staves are then fed into the forming mechanism with the ends for the hogshead bottom around a head and liner, holding means being provided to hold the head and liner in place prior to nailing or stapling. As the connected staves are fed into the forming apparatus bands are automatically stapled or nailed around the exterior of the hogshead being formed, such staples securing the head and liner in place. After all of the staves have been nailed to the head and liner, rotation of the hogshead is stopped, the wires cut and tied, the bands cut and stapled, and the hogshead automatically ejected by a power operated plunger type ejector.

The conveyor and forming apparatus are driven from the same source of power so that their operation is synchronized. Only one or two operators are required to keep the machine in substantially continuous operation.

With continued reference to the drawing, a conveyor table 10 is illustrated having a plurality of spaced legs on which are mounted left and right channel members 12 and 13, respectively. Channel 12 is secured directly to the top of legs 11. Channel 13, however, is secured to lateral arm 14 which extends outwardly at the side beyond its leg and has a plurality of spaced apertures 15 and 16 in order that the spacing of the rails 12 and 13 may be varied for the production of hogsheads of different lengths.

In order to guide staves on the table and prevent them from buckling when urged toward the barrel forming apparatus, guide members 18 and 20 are mounted on the channels 12 and 13, respectively. The guide members extend from the feeding end of the table sufficiently far to accommodate at least one complete set of staves, and have their rear extremities outwardly flared to permit staves to easily enter. In order to simplify loading of staves on the conveyor prior to operation, guide 18 is hinged at 21 and normally held in upright position by slidable latch 22 which is operable by moving projection 23. Guide 20, however, is rigidly connected to channel 13 by suitable fastening means 24.

A conveyor mechanism, the details of which will be described later, includes a pair of conveyor chains 25, preferably of the roller type, each of which has cleats 26 spaced longitudinally on the chain a distance corresponding to the combined width of the staves required to form a single hogshead.

The hogshead forming apparatus includes a pair of spaced end frame members 32, 31 for the bottom and top ends of the hogshead, respectively. Frame member 32 is comprised of a substantially rectangular end plate having an inwardly directed flange 33 on its outer edge and a circular opening 34 having a flange 35 extending inwardly. Frame member 31 (Figs. 3 and 4) is shaped similarly to frame member 32 except that in place of a circular opening it has a plurality of quadrant openings 36. Frame members 31 and 32 are held in spaced relationship by a plurality of spaced rods 37, 38, 39 and 40 extending therebetween adjacent to their outer edges at approximately their four corners.

A drum 42 is provided around which the staves are positioned while they are being fastened to the head and liner. The drum 42 includes a cylindrical form 43 connected by spider 44 to bearing sleeve 45 which is rotatable about an inner bearing member 46 which is immovably mounted around cylinder 47. The bearing member 46 is mounted at one end by brackets 48 to the frame member 31. The cylinder has a piston rod 49 on the exposed end of which is an ejector plate 50. The rod and ejector plate are movable by pneumatic or other means under the control of an operator through the lines 51, 52. The stroke of piston rod 49 is sufficient to entirely eject a completed hogshead from the forming apparatus.

In order to hold the staves in contact with the drum 42, a plurality of transport rollers 60 are provided. With particular reference to Figs. 1, 4, 5 and 6, each of the rollers is mounted on a shaft 61 onto which the cylindrical roller members 62 are mounted by end closure members 63 fixed to the shaft 61 adjacent each end thereof and between the end members 31 and 32, such closure members 63 being fixed to the hollow roller members 62 by any suitable means such as welding, keys or the like and the closure member 63 being fixed to the shaft 61 by any suitable means such as welding, keys or the like whereby the rollers 62 are positively rotated when the shaft 61 is rotated by the sprocket 66. Flanged bushings 64 are mounted in the frame members, frame members 31 and 32 being illustrated in Fig. 5. A sprocket 66 is keyed to the end of shaft 61 projecting beyond the bushing 64 at the end of the apparatus designed to accommodate the top end of the barrel, as indicated in Figs. 4 and 5. In order to permit initial positioning of the rollers, the bushings 64' in the bottom end frame 32 and bushings 64 in the top end frame 31 are of oblong or oval configuration, as indicated in Fig. 6, and positioned in oblong openings 67 forming adjustable mountings in the end frame member 32. The longest dimension of the opening 67 extends radially from the axis of the drum so that variations in thickness of the staves in a radial direction may be accommodated. The rollers 62 are spaced from the periphery of the drum 43 a distance corresponding to the thickness of the staves S whereby shaping of the series of wire connected staves is accomplished until the leading end of the series abuts the trailing end of the same series at which time the wires are secured together and the overlapping ends of the bands are stapled to the staves, the head and the liner.

In order to urge the head H upwardly against the staves and hold it in such position for stapling, a pair of spaced rollers 65 are pivotally mounted inside of the lower portion of the frame 32, the rollers being urged upwardly by compression spring 65'. Staves being formed around the head will contact the rollers 65 and be urged upwardly against the head, the rollers being depressed somewhat downwardly at the time.

With particular reference to Figs. 1, 2, 4 and 7, a plurality of spaced liner and bottom holding roller units 70 are mounted on the frame member 32. Each of the units 70 includes a pair of outwardly inclined spaced legs 71 rigidly mounted on the frame member 32, the units being spaced approximately equally around the opening 34. Pivotally mounted intermediate the legs 71 is a cylinder 72 having a rod 73, the end of which is pivotally connected by yoke 74 to roller arm 75. The roller arm 75 is mounted on pivot pin 76, which is in turn mounted on the frame member 32. Roller 78 extends laterally from the other end of arm 75. Pneumatic or fluid type control lines 79, 80 extend from the cylinder 72 to a suitable control means. As indicated in Fig. 7, the roller arm is movable from a position in which the head H and liner L are held in position against the stave S, the roller arm being retractable out of the way of the hogshead in order that the same may be ejected axially. A hinged anvil 78' Fig. 1 is also mounted on the frame end 32 and positioned to be swung under a bottom stapler later to be described.

With particular reference to Figs. 1, 2, 3 and 8, the stave feeding and aligning and the stapling mechanism will now be described. The conveyor chains 25 are carried at the rear end of the table on idler sprockets 81 mounted on a shaft 82 intermediate the sides of the table. At the far end of the table, adjacent to the hogshead forming apparatus, shaft 83 is mounted having sprockets 84 around which the chains 25 are engaged. Other idler sprockets may be provided intermediate the shafts 82 and 83 as desired to give further support to the chain 25.

Lugs 26 and 26' are attached in spaced relation to chain 25. The distance between forward lug 26' and rear lug 26 being equal to the circumference of one complete hogshead. A space of approximately 12 to 18 inches is provided between rear lug 26 and the next forward lug 26' to allow micro-switch 180 to cut off, thereby stopping staplers 135—138, and to facilitate the tying of the wires on the preceding hogshead.

Conveyor shaft 83 has at one end a sprocket 85 which is driven by chain 86 engaged with drive sprocket 87 which is driven by motor 88 through clutch 89. Shaft 83 also has a drive gear 84' engaged with gear 90 on jack shaft 91, which is mounted between the rails 12 and 13. Shaft 91 drives sprocket 90' at one end thereof, which in turn drives sprocket 92 by means of chain 93. Sprocket 92 is mounted on shaft 92' on which a pair of coarse toothed wheels 93', 94 are mounted in spaced relation. Shaft 92' is carried on bracket members 95, 96 which are mounted on the rims of the frame members 31 and 32. Shaft 92' is mounted above the tracks 18 and 20 a sufficient distance that the periphery of the toothed wheels or feed sprockets 93', 94 will engage staves passing thereunder in the guides. Supporting bars 93'', 94' are mounted under the feed sprockets 93', 94 in position to support staves passing thereover so that the feed sprockets can firmly engage the staves for feeding purposes. This permits the staves to be fed continuously by the feeding action of conveyor shaft 83, the staplers operating rapidly to avoid interference with the feeding action. The stapling takes place rapidly so as not to interfere with the movement of the staves and, if desired, the staplers may be mounted for limited movement in the direction of movement of the staves in a well known manner to avoid interference in feeding.

The shaft 83 also has a star wheel 98 mounted thereon whose points 99 are spaced apart approximately 5" on its periphery to intermittently engage a micro-switch 100 which actuates four wire staplers presently to be described. A second star wheel 98' is also mounted on shaft 83 and has its points spaced to cause actuation of the staplers approximately every two and a half inches, it being necessary to move micro-switch 100 so that it may engage star wheel 98'. The purpose of this is to cause the staplers to be actuated so that at least one staple is inserted into each stave and preferably one staple is inserted for said wire for each stave.

With particular reference to Figs. 2, 8 and 9, aligning member 102 is mounted on the rail 13 adjacent to the end of guide member 20. The aligning member has a longitudinal channel member 104 which is attached to the rail 13 by bolt 105 having a reduced threaded end portion 106 and an enlarged shank 107. In the illustrated embodiment a pair of channel members or pushers 108 are shown, each of which has a curved extremity 109 and is slidably mounted on the upper co-planar surfaces of the rail 13 and channel 104 by bolt 110 which extends through an elongated slot into the upper wall of the outer channel 104. A coil type compression spring 111 is mounted on the shank of bolt 105 and tends to urge the pusher 108 toward the staves S as they pass in contact therewith, the staves being urged against the opposite guide 18 just before being stapled together. The pusher members 108 are continuously urged into engagement with staves S but the inner ends 109 of the pushers 108 are tapered sufficiently so that the sliding of the staves on the rail 13 will cause the leading edge of the adjacent end of the stave to cam the pusher 108 outwardly against the bias of the spring 111 thereby assuring that the staves S are continuously urged against the stationery guide 18 to assure that the bottom ends of the staves are in accurate alignment. It will therefore be seen that it is unnecessary to have any means to retract the pusher 108.

In order to assist the operator in moving the staves into forward position on the conveyor prior to and during operation of the latter, a drag chain unit is provided, as indicated in Figs. 1, 2 and 3. The drag chain unit includes front and rear bracket members 116 and 117 secured to the rails 12 and 13 and having upright portions between which the drag chain shafts 119 and 120 are mounted. Suitable sprockets 121, 122 are mounted on the shafts which carry a pair of loose chains 124 which may be provided with additional stave engaging elements if desired. The drag chain unit is preferably driven from a separate source of power such as motor 126, driving chain 127 and sprocket 128 in order that it may run continuously.

The invention contemplates that the staves for a hogshead after being placed on the conveyor and brought into side-by-side proximity therewith and their bottom ends aligned by the pusher described will be secured together by flexible means such as wire stapled to, or by metal straps nailed to, the staves prior to entering the hogshead forming apparatus. In order to accomplish this a stapler or nailer supporting bar 130 having a plurality of series of spaced elongated slots 131, 132, 133 and 134 for adjustably mounting the fastener inserters such as staplers is mounted intermediate the frame end members 31, 32 adjacent to the rearward upper corners thereof.

In the illustration four staplers 135, 136, 137 and 138 are shown, staplers 135 and 138 having their stapling ends closely adjacent to the mounting bar 130, and staplers 136 and 137 having their stapling ends projecting outward therefrom approximately 2½ inches from staplers 135 and 138; the purpose of this is to insure that at least one staple will connect each wire to each stave, the staves varying in width from approximately 3 to 5 inches. Two staples per wire will enter many staves, however, and it will be impossible for any to receive less than one. The fact that staves first come under staplers 136, 137 and then after 2½ inches of travel the same portion of the staves comes under staplers 138, 135 assures that if the staves are at least 2½ inches wide and all of the staplers operate once for every 5 inches of travel of the conveyor and the series of staves that at least one staple and frequently two staples will pass through each stave positively securing the staves to the wires. For feeding staples to the staplers 135—138 a feed tube 140 is provided for each which extends at an angle upwardly and rearwardly from the feeding end of the staples.

The staplers are preferably pneumatically operated by means of an air hose connections thereto (not shown) having individual valves so that all or various combinations of the staplers may be used at a time. For example, in the event that it is only desired to staple two wires to the staves the inside staplers 136, 137 may be inoperative and the outside staplers 135, 138 used, the micro-switch 100 being placed in position for operation by star wheel 98′ so that the operative staplers may engage each stave.

The staplers 136 and 137 are spaced rearwardly in the line of feed with respect to end staplers 135 and 138 and the micro switch 100 is preferably arranged to operate staplers 135 and 137 or to operate staplers 136 and 138. The staves are normally from 3 to 5 inches wide and by such an arrangement each wire will have one staple in each stave thereby assuring positive connection of each stave to each wire. In any case, there is assurance that two staples will extend into each stave thereby assuring that no stave will be disconnected from at least some of the wires. Where closer spacing is required, the micro switch may be actuated by the star wheel 98′ which has twice as many projections thereby placing the staples closer together on the staves in the ratio of two to one.

Wire is provided by reels 141, 142, 143 and 144 mounted on shafts which are supported in bracket 145 mounted on the rails 12 and 13. The shafts on which adjacent spools are mounted are of different lengths in order that the spools may be placed at different elevations and thus accommodate spools of large diameter. Guide tubes 146 are provided for the wires feeding from each reel.

The device also includes means for applying bands adjacent to the ends of the hogshead. With particular reference to Figs. 1, 2 and 3, reels 150 for carrying metal bands are mounted in spaced relation on shaft 151 which is carried intermediate the sides of bracket 116. The reels are aligned to feed the bands under band staplers 154 and 155 located at the bottom and top ends of the hogshead forming mechanism respectively, the bands passing through slots 130′ at each end of the bar 130. With particular reference to Figs. 10 and 11, the band stapler 154 is mounted on a bracket 156 which is reciprocable between the spaced arms 157 and 158 which extend inwardly from the upper interior side of the frame member 32. Bracket 156 has one end slidably mounted in slot 160 and the other end carried by follower arm 162 which has a cam follower 163 engageable with cam slot 164 which extends entirely around the end portion of roller 62′ at approximately the top of the hogshead forming apparatus. As shown in Figs. 10 and 11, a lever 166 is mounted adjacent to the stapler 154 and the lever 166 is moved by engagement of the metal band and/or the staves with lever 166 which is engageable with a micro-switch 167. Micro-switch 167 is in series with mciro-switches 168 and 169 which are mounted on arm 158 in position to be engaged by follower arm 162 at its extreme in and out positions. The circuit to the band stapler 154 is completed by operation of micro-switch 167 and either of the micro-switches 168 and 169. The operation of the stapler 154 can also be accomplished when a stave lies thereunder to cause displacement of lever 166 and the stapler 154 may be manually operated by disengagement of follower 163 from its cam slot 164 and the operator can then move follower arm 162 against micro switch 169 to drive staples into the end portion of the staves and into the liner, or by movement of the follower arm 162 into engagement with micro switch 168 staples can be driven through the staves into the head. The micro switch 167 will be closed by lever 166 being displaced to closed condition by the presence of a stave or by the presence of the band thereby permitting the manual operation of the staplers to be accomplished as desired. There is no need for operating stapler 154 unless a stave or band is in position to move lever 166 to operate switch 167 and, as described above, micro switch 167 may be manually closed or an additional switch may be provided in parallel circuit with switch 167.

Instead of reciprocating stapler 154 to alternately staple through the liner and the head, the stapler may be fixed in position and employ a staple of sufficient width to engage both the liner and the head at one time. Obviously, a pair of band staplers could be used in place of the one band stapler 154 and positioned to feed staples into the liner and the head either at the same time or alternately. The band stapler 155 may be connected to the same supply of compressed air or other operating medium as stapler 154 and operable in response to operation of either micro-switch 168 or 169. The purpose of the reciprocating arrangement described for stapler 154 is to permit the use of a single narrow stapler and insure that each stave receives at least one staple or the leg thereof, alternately through the band, stave, and liner, and then through the band and stave into the bottom head.

As indicated in Figs. 3 and 4, the drive motor 88 operates drive sprocket 172 and drives chain 174 which runs over idlers 175 and 176 mounted on the frame end member 31 and is engaged with the sprockets 66 at the ends of the rollers 60 and 62′. Intermediate the rollers, guide sheets 178 may be provided as required, the number of rollers and spacing of the guide sheets being selected to suit the particular installation.

As indicated earlier with reference to Fig. 8, micro-switch 100 is actuated at regular intervals by the wheel 98 or 98′ which is rotated by the conveyor shaft 83. Micro-switch 100 is in series with an auxiliary microswitch 180 which is controlled by roller 181 mounted on an arm 182, the arm 8 being mounted at its rear portion 183 on the interior of the frame end 31 adjacent to the upper rear corner and spaced just above the guide for the staves so that when staves pass thereunder the microswitch 180 will be held in closed position. Mounted intermediate the frame ends 31, 32 at the ends of channels 12 and 13 is square rod 40 to which an angle member 187 is attached to provide an extended anvil surface over which the staves will pass and beneath the staplers 135—138. The angle member 187 has slots 188 and 189 which permit the cleats 26, 26' on the conveyor chain to pass over the sprockets 84.

Operation

Although the machine may be operated by one man, production is substantially accelerated if two are used, one spending practically his entire time loading staves on the table and assisting in tieing the wires after a hogshead is formed.

The operator feeding staves lays them first on the end of the table remote from the hogshead former and moves them from their side-by-side position onto the forward portion of the table with their ends intermediate the side guides, the guide 18 having been rotated to open position as indicated in phantom in Fig. 12 until a complete load is mounted on the table intermediate the cleats 26, 26' of the first set at which time guide 18 is closed. The operator has previously started operation of motor 126 driving the drag chains 124 and these are left running continuously. As the operator feeds staves onto the table intermediate the side guides the staves are moved by the drag chains 124 forwardly into close side-by-side relation adjacent the forward cleats 26'.

With the hogshead ejector plate in retracted position as shown in Fig. 4 an operator places a hogshead head H against the ejector plate 50 with the batten B of the hogshead in the slot 50' of the plate and a liner strip L in the position for stapling as indicated in Figs. 4 and 7. The four roller arms 78 are then swung into place by the actuation of means under control of the operator in order to hold the head and liner in proper position. The hinged anvil 78' is then swung down by the operator into position as indicated in Fig. 1. The operator then closes a switch to cause the motor 88 to operate in order to move the conveyor chain and bring the first stave under the staplers 135—138, the ends of the staves for the bottom of the hogshead being aligned by being pressed against the corresponding side guide rail by the pusher 102 mounted on the opposite side as they pass the pusher.

At the forming end of the machine after the first stave is positioned under the staplers 135—138 wires are manually drawn off the reels 141—144 through their respective guides and held in position for engagement by the staplers. The staplers 135—138 are actuated as soon as the first stave is in position, through the operation of micro-switches 100, 180. The operator and the loader place the ends of the bands feeding from the reels 150 under the staplers 154, 155 and in engagement with the micro-switch actuator arms 166 in order to staple the ends of the bands to the first stave at each of its ends. This is done at the completion of each hogshead when the bands are manually cut so that no further operation is necessary. Inasmuch as the chain 174 is continuously rotating the transport roll including roll 62' which causes actuation of micro-switches 168 and 169, operation of micro-switch 167 as described is sufficient to complete the circuit to the band staplers.

After connecting the ends of the two wires to the first stave at its ends the operator releases the clutch 89 and permits the machine to form the connected staves into cylindrical configuration. The transport rollers engage the staves as they pass beneath them and produce clockwise motion of the drum as viewed in Fig. 3, operation of the staplers being automatic. When the last stave on the conveyor has passed beyond the wire staplers 135—138 the micro-switch 180 will open to stop operation of these staplers. Operation of the band staplers will continue, however. When the operator observes that the last stave has passed the wire stapler he disengages clutch 89 to stop the conveyor. When the last stave reaches the open space at the top of the machine just prior to passing under the band stapler, he may de-energize the motor 88 to stop the machine sufficiently long for him and his assistant to cut the wires and twist their ends together. At the same time they cut the bands a few inches past their leading ends. The operator then lifts the cam follower 163 from the groove 164 so that the arm 162 and band stapler 154 may be moved into engagement with micro-switch 169 and held there for stapling the last stave or two and the overlapped ends of the band. The operator then starts the motor 88 in order to permit stapling of the staves and band ends where they overlap. Cam follower 163 returns to groove 164 when operation is resumed. Because of the height and width of the machine it is usually preferable for one opertator to cut and tie the wires at one end of the hogshead and another to cut and tie the remainder at the other end.

The operator then swings the anvil 78' out from under the reciprocable band stapler and the head and liner holding rollers out of the way, following which he operates the controls to cylinder 47 which has a stroke sufficiently long to completely eject the hogshead from the machine. The rollers may be run during ejection of the hogshead, if necessary, to facilitate freeing it. Upon retraction of the hogshead another cycle is begun.

Accordingly, it will be understood that the hogshead machine of the present invention provides improved stave guiding and conveying means which facilitate the rapid loading and feeding of the staves and hogshead forming apparatus having automatically operated staplers for connecting wires to the continuously moving staves and bands to the ends of the staves including the bottom head and liner, the forming portion having an internal rigid drum around which the connected staves are formed and moved by transport rollers and guides, means being provided for holding the head and liner in position during production of the hogshead, and an ejector for removing the completed hogshead, substantially all of the operations being performed automatically after the stapling of the first stave.

It will be obvious to those skilled in the art that various changes may be made in the invention without departing from the spirit and scope thereof and, therefore, the invention is not limited by that which is illustrated in the drawing and described in the specification, but only as indicated in the accompanying claims.

What is claimed is:

1. A hogshead machine comprising an elongated table having spaced guides at its sides for receiving the ends of staves in side-by-side relation, a conveyor having spaced means for receiving and positively moving the staves for a single hogshead at a time along the table to a delivery end, hogshead forming apparatus at the delivery end of the conveyor for receiving staves in side-by-side relation therefrom, said apparatus comprising spaced members, one for the top and one for the bottom end of a hogshead, a cylinder and piston assembly mounted transversely to the table between the spaced end members and having its axis substantially parallel to the staves being received from the delivery end of the table, an ejector plate mounted on the piston at one end of the cylinder, said bottom end member having an opening through which a completed hogshead may be ejected by the ejector plate, a forming drum rotatably mounted around the cylinder, a plurality of rollers rotatably mounted between the end members in spaced relation around the drum, the rollers being spaced radially from the drum approximately the thickness of a stave, the roller mounting means providing for initial adjustment of the rollers radially of the axis of the drum, the rollers being spaced to provide an open space between the rollers adjacent to the delivery end of the conveyor whereby staves from the conveyor may be received between the drum and the rollers, said rollers having sprockets on one of their ends, the sprockets being on the corresponding ends of all the rollers, chain drive means engaged with the outer periphery of said sprockets, anvil means mounted adjacent to the delivery end of the conveyor and positioned so that the staves will be fed thereover, a plurality of staplers being positioned intermediate the stave guides and spaced substantially therefrom, wire guiding means for use with each stapler, additional staplers mounted on the hogshead formimng apparatus at the top thereof and adjacent to the bottom and top ends of the hogsheads forming apparatus, retractable anvil means mounted on the bottom end member and adapted to be positioned beneath the stapler at the bottom end, other anvil means mounted on the top end member, retractable roller guides mounted on the ejector member and adapted to hold a head against the bottom end plate and a linear adjacent to its periphery, and band guiding means for use with said additional staplers.

2. A hogshead machine comprising an elongated table having spaced guides for receiving the ends of staves in side-by-side relation, a conveyor having spaced means for receiving and positively moving the staves for a single hogshead at a time along the table to a delivery end, hogshead forming apparatus at the delivery end of the conveyor for receiving staves in side-by-side relation therefrom, said apparatus comprising a cylinder and piston assembly mounted transversely to the table and having its axis substantially parallel to the staves being received from the delivery end of the table, an ejector plate mounted on the piston at one end of the cylinder, a forming drum rotatably mounted on the cylinder, a plurality of rollers, means rotatably mounting the rollers in spaced relation around the drum, the rollers being spaced radially from the drum aprroximately the thickness of a stave, the roller mounting means providing for a limited amount of movement of the rollers radially of the axis of the drum, the rollers being spaced to provide an open space between the rollers adjacent to the delivery end of the conveyor whereby staves from the conveyor may be received between the drum and the rollers, said rollers having sprockets on one of their ends, the sprockets being on the corresponding ends of all the rollers, chain drive means engaged with the outer periphery of said sprockets, anvil means mounted adjacent to the delivery end of the table and positioned so that the staves will be fed thereover, a plurality of staplers mounted in spaced relation above the table and conveyor and over the anvil means, said staplers being positioned intermediate the stave guides and spaced substantially therefrom, wire guiding means for use with each stapler, additional staplers mounted on the hogshead forming apparatus at the top thereof and adjacent to the bottom and top ends of the hogsheads forming apparatus, retractable anvil means adapted to be positioned beneath the stapler at the bottom end, retractable roller guides adapted to hold a head against the ejector plate and a liner adjacent to its periphery, and band guiding means for use with each band stapler.

3. A hogshead machine comprising an elongated table having spaced guides for receiving the ends of staves in side-by-side relation, a conveyor having spaced means for receiving and positively moving the staves for a single hogshead at a time along the table to a delivery end, hogshead forming apparatus at the delivery end of the conveyor for receiving staves in side-by-side relation therefrom, said apparatus comprising a cylinder and piston assembly mounted transversely to the table and having its axis substantially parallel to the staves being received from the delivery end of the conveyor, an ejector plate mounted on the piston at one end of the cylinder, a forming drum rotatably mounted on the cylinder, a plurality of rollers, means rotatably mounting the rollers in spaced relation around the drum, the rollers being spaced radially from the drum approximately the thickness of a stave, the roller mounting means providing for limited movement of the rollers radially of the axis of the drum, the rollers being spaced to provide an open space between the rollers adjacent to the delivery end of the conveyor whereby staves from the conveyor may be received between the drum and the rollers, said rollers having sprockets on one of their ends, the sprockets being on the corresponding ends of all the rollers, chain drive means engaged with the outer periphery of said sprockets, anvil means mounted adjacent to the delivery end of the table and positioned so that the staves will be fed thereover, a plurality of staplers mounted in spaced relation above the table and conveyor and over the anvil means, said staplers being positioned intermediate the stave guides and spaced substantially therefrom, strand guiding means for directing a strand to each stapler for securing the staves in assembled relation, additional staplers mounted on the hogshead forming apparatus at the top thereof and adjacent to the bottom and top ends of the hogsheads forming apparatus, and retractable roller guides mounted on the bottom end member and adapted to hold a head against the ejector plate and a liner adjacent to its periphery.

4. A hogshead machine comprising an elongated table having spaced guides for receiving the ends of staves in side-by-side relation, a conveyor having spaced means for receiving and positively moving the staves for a single hogshead at a time along the table to a delivery end, hogshead forming apparatus at the delivery end of the conveyor for receiving staves in side-by-side relation therefrom, said apparatus comprising a rotatably mounted, forming drum, a plurality of rollers, means rotatably mounting the rollers in spaced relation around the drum, the rollers being spaced radially from the drum approximately the thickness of a stave, the rollers being spaced to provide an open space between the rollers adjacent to the delivery end of the conveyor whereby staves from the conveyor may be received between the drum and the rollers, anvil means mounted adjacent to the delivery end of the table and positioned so that the staves will be fed thereover, first stapler means mounted in spaced relation above the table and conveyor and over the anvil means, said stapler means being positioned intermediate the stave guides and spaced substantially therefrom, guiding means for flexible connecting strip to said first stapler means, additional stapler means mounted on the hogshead forming apparatus at the top thereof and adjacent to the bottom and top ends of the hogshead forming apparatus, and guiding means for flexible connecting strip to said additional stapler means.

5. In a machine for forming hogsheads from staves, a rotatable drum, a plurality of guiding means mounted around the drum and spaced radially therefrom approximately the thickness of a stave to conform the staves to the drum, a cylinder and piston assembly mounted within the drum and having its axis substantially coincident with the axis of the drum, an ejector plate mounted on the piston at one end of the cylinder for engaging a head, retractable holding means moveable from a first position for holding a head against the supporting means to a second position out of the path of a completed hogshead, and at least one fastening instrumentality adjacent to the drum for connecting staves fed between the drum and the guiding means to a head, whereby a head may be placed against the supporting means and held while staves are connected around its periphery to form a hogshead and the assembled head and staves ejected by the cylinder and piston assembly.

6. In a machine for forming hogsheads from staves, a rotatable drum, a plurality of guiding means mounted around the drum and spaced radially therefrom approximately the thickness of a stave to conform the staves to the drum, a cylinder and piston assembly mounted within the drum and having its axis substantially coincident with the axis of the drum, an ejector plate mounted on the piston at one end of the cylinder, and fastening instrumentalities adjacent to the drum for use in assembling staves fed between the drum and the guiding means, and means whereby a head may be placed against the supporting means and held while staves are connected around its periphery to form a hogshead and the assembled head and staves ejected by the cylinder and piston assembly.

7. In a machine for forming hogsheads from staves, a rotatable drum, spaced rollers mounted around the drum and radially spaced therefrom approximately the thickness of a stave, means for supporting a head at one end of the drum around which the staves may be secured, the head being disposed within the ends of the staves, means for supporting the head in a position within the staves whereby a liner may be placed around the interior of the staves in the end adjacent to the head as the hogshead is formed, and means for inserting fasteners around the periphery of the hogshead being formed at the end portion of the staves alternately into a first position overlying the liner and into a second position slightly back of the first position and which overlies the head, said means comprising a fastening member mounted for reciprocation between the first and second positions, means associated with one of the rollers for causing said member to reciprocate between said two positions, and switching means mounted to cause actuation of said fastening member when the latter is in said first and second positions.

8. In a machine for forming hogsheads from staves, a rotatable drum, a plurality of guiding means mounted around the drum and spaced radially therefrom approximately the thickness of a stave to confine the staves to the drum, a cylinder and piston assembly mounted within the drum and having its axis substantially coincident with the axis of the drum, an ejector plate mounted on the piston at one end of the cylinder, and retractable support means positioned to support and maintain a head on the plate during the forming of the hogshead.

9. A hogshead machine comprising an elongated table having spaced guides for receiving the ends of staves in side by side relation, a supporting conveyor having means for moving the staves along the table to a delivery end, driving means for the conveyor, hogshead forming apparatus at the delivery end of the conveyor for receiving staves in side by side relation therefrom, and means for maintaining the staves in close side by side relation along the conveyor comprising an endless chain loosely mounted with a portion dragging along the staves, and means for driving the chain.

10. A hogshead machine comprising a rotatable drum, spaced rollers mounted around the drum and radially spaced therefrom approximately the thickness of a stave, lateral support means at one end of the drum, means for moving the lateral support means axially of and away from the drum, means for delivering staves into the space between the rollers and the drum, first fastening instrumentalities mounted adjacent to the delivery means, guiding means for flexible connecting means mounted adjacent to the first fastening instrumentalities, means for actuating said first fastening instrumentalities automatically and continuously in response to the feeding of staves by the delivery means, other fastening instrumentalities mounted adjacent to the drum, other guiding means for flexible connecting means positioned for feeding to said other fastening instrumentalities, and means for automatically operating said other fastening instrumentalities in response to the presence of staves adjacent the said other fastening instrumentalities.

11. In a hogshead forming machine, a rotatable drum, a plurality of rollers mounted around the drum and spaced radially therefrom approximately the thickness of a stave, supporting means at one end of the drum extending transversely to the axis of the drum adapted to engage a head for a hogshead, means for moving the supporting means axially of the drum, retractable holding means movable from a first position for holding a head against the supporting means to a second position out of the path of a completed hogshead, and at least one fastening instrumentality mounted adjacent to the drum for connecting the staves fed between the drum and the rollers to the head, whereby a head may be placed against the supporting means and held while staves are connected around its periphery to form a hogshead and the assembled head and staves ejected by the movable support means.

12. A hogshead machine comprising hogshead forming apparatus, stave feeding apparatus mounted adjacent to the hogshead forming apparatus for feeding staves thereto, fastening instrumentalities mounted adjacent to the stave feeding apparatus for applying connecting means thereto, means for holding a head in said forming apparatus as said staves are connected thereto, and means for ejecting a completed hogshead from the hogshead forming apparatus, said ejecting means being positioned internally of the hogshead forming apparatus.

References Cited in the file of this patent

UNITED STATES PATENTS

| | | |
|---|---|---|
| 1,103,562 | Clark | July 14, 1914 |
| 1,110,073 | Miller | Sept. 8, 1914 |
| 1,184,030 | Schmitz | May 23, 1916 |
| 1,236,842 | Johnson | Aug. 14, 1917 |
| 2,255,745 | Anderson | Sept. 16, 1941 |
| 2,569,355 | Tubbs | Sept. 25, 1951 |

FOREIGN PATENTS

| | | |
|---|---|---|
| 4009/1882 | Great Britain | Aug. 21, 1882 |